United States Patent [19]

Le-Khac

[11] 4,408,010

[45] Oct. 4, 1983

[54] POLYBLEND OF STYRENE COPOLYMERS AND MOLDED ARTICLE PRODUCED THEREFROM

[75] Inventor: Bi Le-Khac, West Chester, Pa.

[73] Assignee: Atlantic Richfield Company, Los Angeles, Calif.

[21] Appl. No.: 432,492

[22] Filed: Oct. 4, 1982

[51] Int. Cl.³ .................. C08L 35/06; C08L 39/00; C08L 25/08
[52] U.S. Cl. ................................ 525/73; 525/205; 525/74; 525/207
[58] Field of Search .......................... 525/73, 205

[56] References Cited

U.S. PATENT DOCUMENTS

| | | | |
|---|---|---|---|
| 3,642,949 | 2/1972 | Stafford et al. | 525/73 |
| 3,652,726 | 3/1972 | Nield et al. | 525/73 |
| 3,998,907 | 12/1976 | DiGiulio | 525/205 |
| 4,129,619 | 12/1978 | Fava | 525/205 |
| 4,339,554 | 7/1982 | Doak | 525/73 |
| 4,374,951 | 2/1983 | Lee et al. | 525/73 |

Primary Examiner—Carman J. Seccuro
Attorney, Agent, or Firm—Dennis M. Kozak

[57] ABSTRACT

The use of a styrenic copolymer of maleimide to improve the heat resistant properties of styrene/maleic anhydride copolymers is disclosed.

8 Claims, No Drawings

POLYBLEND OF STYRENE COPOLYMERS AND MOLDED ARTICLE PRODUCED THEREFROM

This invention relates to a polyblend which exhibits excellent heat resistant properties.

In one of its more specific aspects, this invention pertains to the use of a styrenic copolymer of maleimide to improve the heat resistant properties of styrene/maleic anhydride copolymers.

According to this invention there is provided a polyblend comprising a first and a second copolymer, the first copolymer comprising an α, β ethylenically unsaturated dicarboxylic acid or its anhydride copolymerized with at least one monovinyl-substituted aryl hydrocarbon monomer and, the second copolymer comprising maleimide copolymerized with at least one monovinyl-substituted aryl hydrocarbon monomer.

Also according to this invention there is provided a method for increasing the heat resistant properties of a copolymer of an α, β ethylenically unsaturated dicarboxylic acid or its anhydride with at least one monovinyl-substituted aryl hydrocarbon monomer, which method comprises forming a polyblend by mixing the first copolymer with an effective amount of a second copolymer of maleimide with at least one monovinyl-substituted aryl hydrocarbon monomer, to increase heat resistant properties of the first copolymer.

It is believed that in addition to imparting heat resistant properties to the styrene/maleic anhydride copolymer that the maleimide/styrene copolymer may cross link with the maleic anhydride on the styrene/maleic anhydride copolymer backbone to extend the molecular weight of the styrene-maleic anhydride to a higher level. The reaction which is believed to take place is as follows:

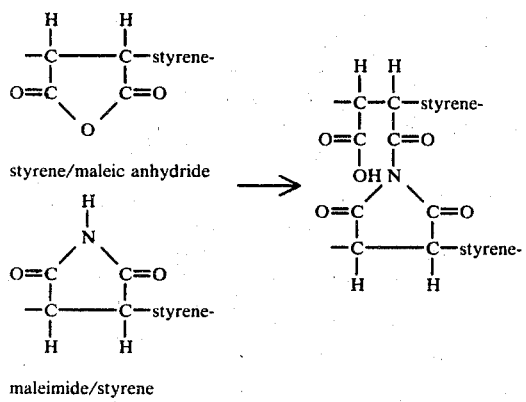

Accordingly, as used herein, the term "polyblend" is understood to mean a mixture in any proportion of two copolymers, (and for the reason presented above, any reaction product which may occur), the mixture being made after the copolymers have been polymerized.

As the first copolymer, use can be made of any non-equimolar copolymer containing less than 50 mole percent of an α, β ethylenically unsaturated dicarboxylic acid or its anhydride and more than 50 percent mole percent of a monovinyl-substituted aryl hydrocarbon monomer.

Dicarboxylic acids and anhydrides particularly suitable for use include maleic, fumaric, itaconic, citraconic, mesaconic, ethyl maleic, methyl itaconic, chloromaleic, bromomaleic, dichloromaleic, dibromomaleic, phenylmaleic and the like.

Suitable for use as the copolymerizable monovinyl-substituted aryl hydrocarbon monomers are those monomers containing 8 to 20 carbon atoms including styrene, alpha-methyl styrene, nuclear methyl styrenes, ethyl styrene, isopropyl styrene, tert-butyl styrene, chlorostyrenes, dichlorostyrenes, bromostyrenes, dibromostyrenes, vinylnaphthalene, and the like.

Suitable non-equimolar first copolymers may be prepared by any of the several methods available for the preparation of non-equimolar copolymers or, they may be purchased commercially.

If desired, these copolymers may be prepared by solution polymerization directly from the respective monomers by the incremental addition of the reactive monomer as taught by U.S. Pat. No. 2,971,939; by a continuous recycle polymerization process such as described in U.S. Pat. Nos. 2,769,804 and 2,989,517; or by the suspension polymerization process described in U.S. Pat. No. 3,509,110. The teachings of these patents are incorporated herein by reference.

Also suitable for use as first copolymers are non-equimolar copolymers which have been impact modified using any art-recognized method of incorporating the impact modifier, which modifier is typically a copolymer or homopolymer rubber or mixtures thereof. Preferably, the impact modifiers are incorporated into the monomer mixture prior to polymerization using for example, the method of U.S. Pat. No. 4,097,551 incorporated herein by reference.

Particularly suitable for use as first copolymers are the non-equimolar copolymers of styrene and maleic anhydride designated Dylark® copolymers, commercially available from ARCO Chemical Company, division of Atlantic Richfield Company. Suitable Dylark copolymers include those of the 200 series the 300 series and Dylark 700 copolymer. Those copolymers designated Dylark 250, Dylark 350 and Dylark 700 are impact modified.

Particularly suitable for use in the blends of this invention and employed in the following examples is Dylark 290 copolymer. Dylark 290 copolymer is a styrenemaleic anhydride copolymer containing about 17 weight percent maleic anhydride, about 83 weight percent styrene and having the following properties:

| Resin Properties | ASTM Method | Value |
|---|---|---|
| Tensile Strength, psi | D638-72 | 6,000 |
| Tensile Elongation, % | D638-72 | 2 |
| Flexural Strength, psi | D790-71 | 12,800 |
| Flexural Modulus, $10^{-5}$, psi | D790-71 | 5.5 |
| Izod Impact, ft. lbs./inch | D256-73 | 0.8 |
| Deflection Temperature Under Load, °F. 264 psi ⅛" × ½" × 5" Speci | D648-72 | 230 |
| Vicat Softening Point, °C. | D1525-70 | 138 |
| Melt Flow, Condition "L" | D1238-73 | 2.0 |

Suitable for use as the second copolymer, that is, the copolymer employed to increase heat resistant properties of the first copolymer, are copolymers of maleimide with from about 10 to about 90 weight percent, preferably 40 to about 70 weight percent of at lease one monovinyl-substituted aryl hydrocarbon monomer which monomers are described above with regard to the first copolymer. The preferred copolymer is a copolymer of maleimide and styrene.

Methods for preparing the maleimide/styrene copolymer are well known and are taught, for example, in J. Macromol, Sci Chem, A11(s), pp 267–286 (1977) incorporated herein by reference. The preferred polymerization process is heterogeneous in methyl ethyl ketone as described in the following examples.

The polyblends of this invention, comprising the first and second copolymers described above, can be prepared using any conventional method of blending including dry powder blending, coagulation from a solution of the copolymers, melt mixing, milling, extrusion and the like.

The following examples further demonstrate the invention.

EXAMPLE I

This example demonstrates the preparation of a maleimide/styrene copolymer suitable for use in the polyblends of this invention.

About 4.85 grams of maleimide, 5.21 grams of styrene, 0.008 gram of benzoyl peroxide and 40 ml of methylethyl ketone (MEK) were added to a Diels-Alder tube under a nitrogen atmosphere and copolymerized at a reaction temperature of 90° C. for about 90 minutes.

After copolymerization, the resultant white copolymer powder was isolated from the MEK solution by filtration, washing with new MEK and drying in a vacuum oven at about 170° C. until constant weight was obtained.

The resulting maleimide/styrene copolymer was tested and found to have a number average molecular weight (Mn) by GPC of 120,000; a glass transition temperature (Tg) by DMA of 243° C. and by DSC of 239° C. Analysis of the copolymer found 51.3 weight percent maleimide and 48.7 weight percent styrene.

EXAMPLE II

This example demonstrates the preparation of a maleimide/styrene copolymer suitable for use in this invention.

About 73 grams of maleimide, 78 grams of styrene, and 604 grams of MEK were added to a one-liter stirred reactor. The mixture was degassed with pure nitrogen and then heated to 80° C. under a nitrogen atmosphere. Next, 0.1208 gram Lupersol 11 initiator (75% solution of t-butyl peroxypivalate), commercially available from Lucidol Division of Wallace & Tiernan, Inc. was added and the temperature in the reactor was held at 80° C. for about 2 hours. The resulting maleimide/styrene copolymer was isolated by filtration and then dried at 170° C. under vacuum until a constant weight was obtained.

The resulting malemide/styrene copolymer was found to have a Mn by GPC of 120,000, a Tg by DMA of 250° C., and analysis found 47.8 weight percent maleimide, and 52.2 weight percent styrene.

EXAMPLE III

This example demonstrates the preparation of a polyblend of this invention.

About 2 grams of the maleimide/styrene copolymer produced in Example I and about 3 grams Dylark 290 copolymer were dissolved in tetrahydrofuran (THF) solvent and reprecipitated in hexane into powder form. The polymer powder was dried in a vacuum oven at 170° C. until a constant weight was obtained and was compression molded into a 1/16" thick film sample using a molding pressure of about 10,000 psi and a mold temperature of about 240° C. for five minutes.

The resulting polyblend molded sample containing 40 weight percent maleimide/styrene copolymer and 60 weight percent Dylark 290 copolymer exhibited glass transition temperatures of 158° C. and 260° C. as measured by DMA.

Since the Dylark 290 copolymer possesses a Tg by DMA of 148° C. and the maleimide/styrene copolymer was found to have a Tg by DMA of 243° C., it is shown by the above Tg data that, quite surprisingly, in the polyblend, the Dylark 290 copolymer gains about 10° C. and the maleimide/stryrene copolymer gains about 17° C. in glass transition temperatures, respectively.

EXAMPLE IV

This example demonstrates the preparation of another polyblend of this invention. About 1 gram of the maleimide/styrene copolymer prepared in Example II and about 5 grams of Dylark 290 copolymer were dissolved in THF solvent and reprecipitated in hexane into powder form. The polymer powder was dried in a vacuum oven at 140° C. until constant weight was achieved. The resulting polymer was compression molded into a 1/16" thick film sample using a molding pressure of about 10,000 psi and a mold temperature of about 240° C. for five minutes.

The resulting polyblend molded sample, containing 17 weight percent maleimide/styrene copolymer and 85 weight percent Dylark 290 copolymer, was found to have a single glass transition temperature of 158° C. as measured by DMA. Accordingly, it is apparent that the incorporation of about 17% maleimide/styrene copolymer served to increase the glass transition temperature of the Dylark 290 by about 10° C., that is, from 148° C. to 158° C.

It will be evident from the foregoing that various modifications can be made to this invention. Such, however, are considered within the scope of this invention.

What is claimed is:

1. A polyblend comprising a first and a second copolymer, the first copolymer consisting essentially of an $\alpha$, $\beta$ ethylenically unsaturated dicarboxylic acid or its anhydride copolymerized with at least one monovinyl-substituted aryl hydrocarbon monomer and, the second copolymer consisting essentially of maleimide copolymerized with at least one monovinyl substituted aryl hydrocarbon monomer and being present in the polyblend in an amount effective to increase the heat resistant properties of the first copolymer.

2. The polyblend of claim 1 in which said first copolymer is a non-equimolar copolymer containing less than 50 mole percent of an $\alpha$, $\beta$ ethylenically unsaturated dicarboxylic acid or its anhydride and more than 50 mole percent of a monovinyl-substituted aryl hydrocarbon monomer.

3. The polyblend of claim 2 in which said first copolymer is styrene/maleic anhydride.

4. The polyblend of claim 2 in which said first copolymer is impact modified.

5. The polyblend of claim 4 in which said impact modifier is a rubber.

6. The polyblend of claim 1 in which said second copolymer is maleimide/styrene.

7. The polyblend of claim 1 in the form of a molded article.

8. A method for increasing the heat resistant properties of a copolymer of an α, β ethylenically unsaturated dicarboxylic acid or its anhydride with at least one monovinyl-substituted aryl hydrocarbon monomer, which method comprises forming a polyblend by mixing the first copolymer with an effective amount of a second copolymer of maleimide with a least one monovinyl-substituted aryl hydrocarbon monomer, to increase the heat resistant properties of the first copolymer.

* * * * *